United States Patent
Qi

(10) Patent No.: US 12,095,858 B2
(45) Date of Patent: *Sep. 17, 2024

(54) APPLICATION SHARING METHOD, ELECTRONIC DEVICE AND COMPUTER READABLE STORAGE MEDIUM

(71) Applicant: VIVO MOBILE COMMUNICATION CO., LTD., Guangdong (CN)

(72) Inventor: Shuangcheng Qi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,218

(22) Filed: May 25, 2022

(65) Prior Publication Data
US 2022/0286504 A1    Sep. 8, 2022

Related U.S. Application Data

(63) Continuation of application No. PCT/CN2020/131346, filed on Nov. 25, 2020.

(30) Foreign Application Priority Data

Dec. 2, 2019  (CN) .......................... 201911211031.0

(51) Int. Cl.
*H04L 67/1095*  (2022.01)
*G06F 9/451*  (2018.01)
*H04W 4/80*  (2018.01)

(52) U.S. Cl.
CPC .......... *H04L 67/1095* (2013.01); *G06F 9/452* (2018.02); *H04W 4/80* (2018.02)

(58) Field of Classification Search
CPC ....... H04L 67/1095; G06F 9/452; H04W 4/80
See application file for complete search history.

(56) References Cited

U.S. PATENT DOCUMENTS

| 2003/0167301 A1* | 9/2003 | Zhu ....................... H04L 69/329 709/204 |
| 2004/0003371 A1 | 1/2004 | Coulthard et al. |
| 2012/0216131 A1* | 8/2012 | Moyers ............... H04L 67/1095 715/757 |

(Continued)

FOREIGN PATENT DOCUMENTS

| CN | 104052801 A | 9/2014 |
| CN | 105915978 A | 8/2016 |

(Continued)

OTHER PUBLICATIONS

Jake Peterson, "YouTube 101: How to Cast Videos to Your TV", Gadget Hacks Shop, Nov. 7, 2017.

*Primary Examiner* — Dhairya A Patel
(74) *Attorney, Agent, or Firm* — Price Heneveld, LLP

(57) ABSTRACT

An application sharing method, an electronic device and a computer readable storage medium are provided. The method includes: in a case that a first application runs in the foreground, receiving a first operation; in response to the first operation, in a case that a first electronic device is connected to a target electronic device, displaying a running interface of the first application in a virtual screen; and sharing the running interface of the first application displayed in the virtual screen with the target electronic device.

6 Claims, 6 Drawing Sheets

---

In a case that a first application runs in the foreground, receiving a first operation — 101

In response to the first operation, in a case that the first electronic device is connected to a target electronic device, displaying a running interface of the first application in a virtual screen — 102

Sharing the running interface of the first application displayed in the virtual screen to the target electronic device — 103

(56) References Cited

U.S. PATENT DOCUMENTS

| | | | |
|---|---|---|---|
| 2015/0061970 A1 | 3/2015 | Kim et al. | |
| 2015/0067045 A1* | 3/2015 | Bharadwaj Shamarao Venkata Rao | H04L 65/4038 709/204 |
| 2015/0339090 A1 | 11/2015 | Lee et al. | |
| 2015/0350312 A1 | 12/2015 | Lin et al. | |
| 2016/0014209 A1* | 1/2016 | Cesena | H04L 67/146 709/203 |
| 2016/0077685 A1 | 3/2016 | Fang et al. | |
| 2017/0093833 A1 | 5/2017 | Sugaya | |
| 2017/0126689 A1* | 5/2017 | Lloyd | G06F 3/04817 |
| 2017/0195266 A1* | 7/2017 | Moyers | H04L 51/216 |
| 2018/0336373 A1* | 11/2018 | Deenadayal | G06T 5/70 |
| 2018/0341374 A1* | 11/2018 | Faulkner | H04L 65/4015 |
| 2019/0068661 A1* | 2/2019 | Masi | G06F 3/1454 |
| 2019/0073490 A1* | 3/2019 | Agrawal | G06F 3/1454 |
| 2019/0188012 A1 | 6/2019 | Chen et al. | |
| 2019/0235715 A1* | 8/2019 | Yoshida | H04L 65/4015 |
| 2019/0379712 A1* | 12/2019 | Mota | H04L 65/1089 |
| 2020/0057596 A1* | 2/2020 | Kim | G06F 3/147 |
| 2021/0064191 A1* | 3/2021 | Liao | G06F 3/04845 |
| 2021/0183336 A1* | 6/2021 | Hassan | G06F 3/04886 |
| 2022/0147228 A1* | 5/2022 | Yi | H04M 1/72412 |
| 2022/0286496 A1 | 9/2022 | Qi | |
| 2022/0309037 A1* | 9/2022 | Gutierrez | G06F 16/16 |

FOREIGN PATENT DOCUMENTS

| | | |
|---|---|---|
| CN | 106331758 A | 1/2017 |
| CN | 106453538 A | 2/2017 |
| CN | 109032485 A | 12/2018 |
| CN | 109739429 A | 5/2019 |
| CN | 109976821 A | 7/2019 |
| CN | 110427239 A | 11/2019 |
| CN | 110515576 A | 11/2019 |
| CN | 110515579 A | 11/2019 |
| CN | 110851220 A | 2/2020 |
| CN | 110990172 A | 4/2020 |
| CN | 111026484 A | 4/2020 |
| CN | 111049979 A | 4/2020 |
| CN | 111049980 A | 4/2020 |
| EP | 3786792 A1 | 3/2021 |
| JP | 2017068537 A | 4/2017 |
| JP | 2022502719 A | 1/2022 |
| KR | 20150025584 A | 3/2015 |
| KR | 20170038614 A | 4/2017 |
| KR | 20210028046 A | 3/2021 |
| WO | 2021035884 A1 | 3/2021 |

\* cited by examiner

APPLICATION SHARING METHOD, ELECTRONIC DEVICE AND COMPUTER READABLE STORAGE MEDIUM

CROSS-REFERENCE TO RELATED APPLICATIONS

This application is a continuation application of PCT International Application No. PCT/CN2020/131346 filed on Nov. 25, 2020, which claims priority to Chinese Patent Application No. 201911211031.0, filed in China on Dec. 2, 2019, which are incorporated herein by reference in their entireties.

TECHNICAL FIELD

The present application relates to the technical field of communication, and in particular, to an application sharing method, an electronic device and a computer readable storage medium.

BACKGROUND

With the rapid development of the computer technology, the functions of electronic devices are becoming more and more richer, and the demand for sharing functions among different electronic devices is stronger and stronger. For example, application sharing is a common sharing demand.

At present, the common application sharing manner among the electronic devices is remote control through remote control software, that is, two electronic devices can be connected through a remote control application, and one device control the desktop of the other device. At this time, the applications on the desktop can be viewed, so that the application in one device is shared to the other device for use. However, in the above sharing process, the device sharing the application is controlled by the other device, and the device cannot be operated, resulting in low utilization rate of the device.

SUMMARY

According to a first aspect, the embodiments of the present application provide an application sharing method, applied to a first electronic device. The method includes:
in a case that a first application runs in the foreground, receiving a first operation;
in response to the first operation, in a case that a first electronic device is connected to a target electronic device, displaying a running interface of the first application in a virtual screen; and
sharing the running interface of the first application displayed in the virtual screen with the target electronic device.

According to a second aspect, the embodiments of the present application further provide an electronic device. The electronic device is a first electronic device and includes:
a first receiving module, configured to: in a case that a first application runs in the foreground, receive a first operation;
a first electronic device, configured to: in response to the first operation, in a case that a first electronic device is connected to a target electronic device, display a running interface of the first application in a virtual screen; and
a sharing module, configured to: share the running interface of the first application displayed in the virtual screen to the target electronic device.

According to a third aspect, the embodiments of the present application further provide an electronic device, including: a memory and a processor, wherein the memory stores a computer program; and when the computer program is executed by the processor, the steps of the application sharing method according to each embodiment of the present application are implemented.

According to a fourth aspect, the embodiments of the present application further provide a computer readable storage medium, wherein the computer readable storage medium stores a computer program; and when the computer program is executed by a processor, the steps of the application sharing method according to each embodiment of the present application are implemented.

According to a fifth aspect, the embodiments of the present application further provide a computer program product, wherein the computer program product is stored in a non-volatile storage medium; and the computer program product is executed by at least one processor to implement the steps of the above application sharing method.

According to a sixth aspect, the embodiments of the present application further provide a first electronic device, wherein the first electronic device is configured to perform the steps of the above application sharing method.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Figure 1:
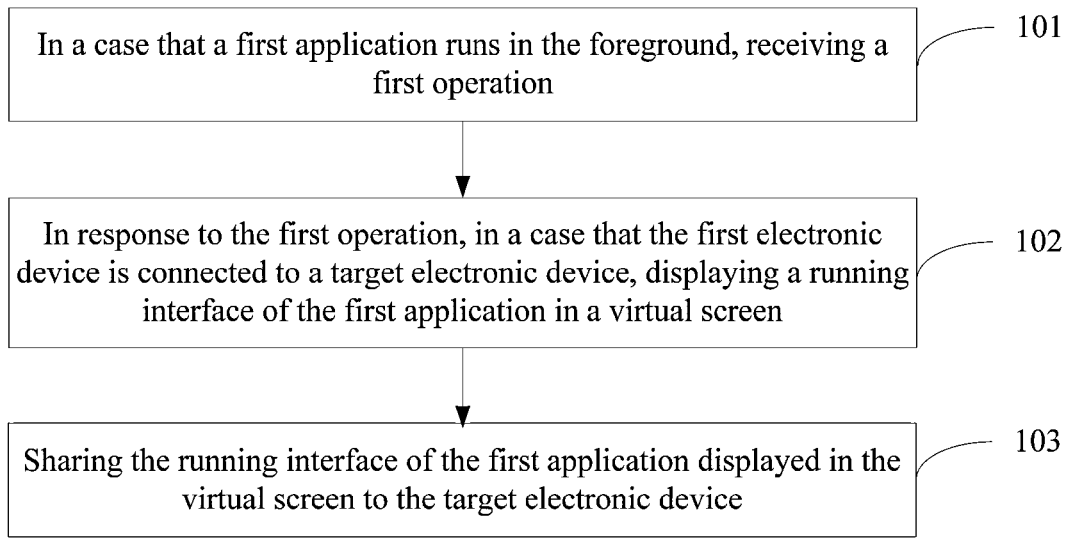
FIG. 1 is a first flowchart of an application sharing method according to an embodiment of the present application.
Figure 2:
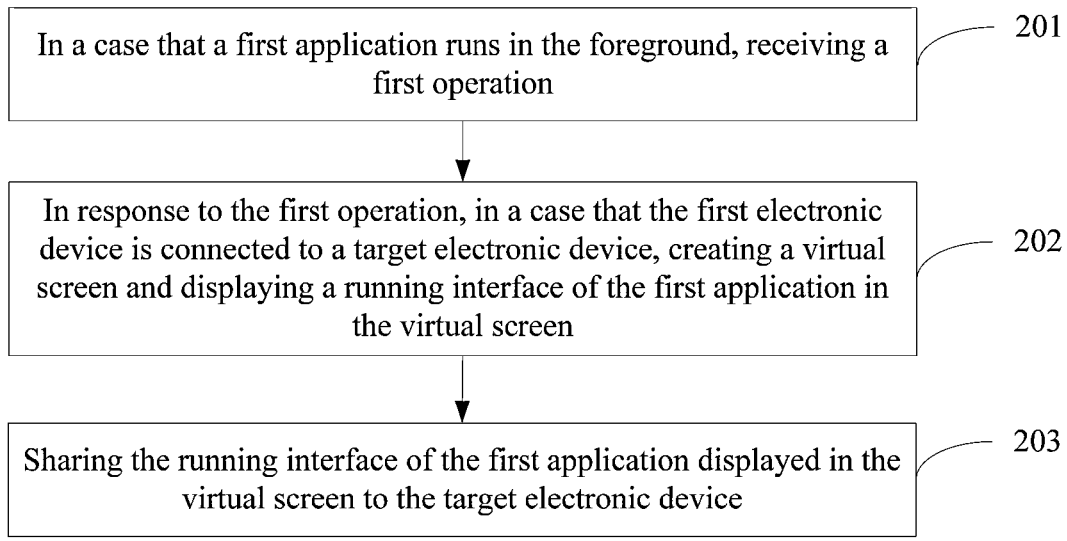
FIG. 2 is a second flowchart of an application sharing method according to an embodiment of the present application.

Referring to FIG. 1, in one embodiment, an application sharing method is provided and applied to a first electronic device. The method includes:

Step 101: in a case that a first application runs in the foreground, receiving a first operation.

The first application is running in the foreground. In a case that it is necessary to share the first application to other electronic devices, the first operation may be performed on the first electronic device. The first electronic device performs the subsequent specific sharing process after receiving the first operation. In one example, the first operation may be a click operation and the like.

Step 102: in response to the first operation, in a case that the first electronic device is connected to a target electronic device, displaying a running interface of the first application in a virtual screen.

In the process of sharing the first application, the first application is shared to the target electronic device. In this way, it is necessary to establish connection between the first electronic device and the target electronic device, that is, in a case that the first electronic device is connected to the target electronic device, the running interface of the first application may be displayed in the virtual screen, that is, the first application still runs.

Step 103: sharing the running interface of the first application displayed in the virtual screen with the target electronic device.

After the running interface of the first application is displayed in the virtual screen, the running interface of the first application displayed in the virtual screen may be shared to the target electronic device, and the running interface of the first application is displayed in the virtual screen, so that the first application is shared.

According to the application sharing method provided by the embodiments of the present application, the first application runs in the foreground, and the running interface of the first application is displayed in the virtual screen after the first operation is received. At this time, a user still can perform other operations on the first electronic device, for example, related operations on other applications and other functional operations. An operation performed by the user on the first electronic device is not affected by first application sharing. It can be understood that in the process that the first electronic device shares the first application, since the running interface of the first application runs in the virtual screen, other functions of the first electronic device are not affected, and a user still can perform operation for the first electronic device, so that the utilization rate of the first electronic device can be increased.

In one example, the first electronic device and the second electronic device may be, but are not limited to a mobile phone, a tablet personal computer, a laptop computer, a personal digital assistant (PDA), a mobile Internet device (MID) or a wearable device.

In one embodiment, the step of displaying the running interface of the first application in the virtual screen includes: creating a virtual screen and displaying the running interface of the first application in the virtual screen. That is, in this embodiment, an application sharing method is provided and applied to a first electronic device. The method includes:

Step 201: in a case that a first application runs in the foreground, receiving a first operation.

Step 202: in response to the first operation, in a case that the first electronic device is connected to a target electronic device, creating a virtual screen and displaying a running interface of the first application in the virtual screen.

Step 203: sharing the running interface of the first application displayed in the virtual screen with the target electronic device.

The step 201 corresponds to the step 101, and the step 203 corresponds to the step 103, which will not be elaborated herein.

That is, in a case that the first electronic device is connected to the target electronic device, in response to the first operation, a virtual screen can be created first, and then the running interface of the first application is put into the virtual screen to run, that is, the first application still runs. At this time, a user still can perform other operations on the first electronic device, for example, related operations on other applications and other functional operations. An operation performed by the user on the first electronic device is not affected by first application sharing. In one example, the running interface of the first application can be switched from the foreground to the virtual screen to display. In this way, the foreground cannot display the running interface any more, and power consumption is reduced.

In one embodiment, the step of creating the virtual screen and displaying the running interface of the first application in the virtual screen includes: creating a virtual screen and displaying the running interface of the first application in the virtual screen.

That is, in a case that the first electronic device is connected to the target electronic device, in response to the first operation, a virtual screen can be created in the background, the virtual screen runs in the background, and the running interface of the first application is put into the virtual screen to run, that is, the first application still runs. Since the virtual screen is created in the background, that is, the virtual screen runs in the background, the running interface of the first application is put into the virtual screen to run, that is, the running interface can run in the background. At this time, a user still can perform other operations on the first electronic device, for example, related operations on other applications and other functional operations. An operation performed by the user on the first electronic device is not affected by first application sharing.

In one of the embodiments, after the virtual screen is created in the background and the running interface of the first application is displayed in the virtual screen, the method further includes: displaying a virtual screen. That is, the virtual screen is switched to the foreground to run, so that the first application is switched to the foreground to run accordingly.

In this embodiment, after the running interface of the first application is displayed in the virtual screen created in the background, the virtual screen can be switched to the foreground to run, so that the running situation of the first application in the virtual screen can be viewed and can be understood by a user conveniently. The user may also operate the first application on the virtual screen which runs in the foreground to realize functions, that is, after the virtual screen is displayed in the foreground, the first electronic device may receive an input for the first application on the virtual screen and perform an operation related to the input in response to the input, so that the operation for the first application is facilitated.

In one of the embodiments, in a case that the first electronic device is connected to the target electronic device, before the step of displaying the running interface of the first application in the virtual screen, the method further includes: displaying device information of at least one second electronic device; and receiving a selecting operation for the target electronic device from the second electronic device, and establishing connection between the first electronic device and the target electronic device.

The second electronic device is an electronic device which can be connected to the first electronic device, and device information of at least one second electronic device can be displayed, so that it is convenient for a user to view device information of the second electronic device which can be connected to the first electronic device. Then, device selection may be performed in at least one second electronic device. After the selecting operation for the target electronic device from the second electronic device is received, connection between the first electronic device and the target electronic device may be established, and the target electronic device may be one second electronic device selected by a user from the at least one second electronic device. In this way, the first application may be shared to the target electronic device. In this embodiment, device information of at least one second electronic device is displayed, and a user selects and determines the target electronic device to which the application needs to be shared, so that the requirement of a user for receiving the electronic device to which the application is shared is met.

In one embodiment, the target electronic device may be a second electronic device which is determined by the first electronic device according to historical record, for example, a recently connected second electronic device.

In one of the embodiments, the step of receiving the selecting operation for the target electronic device from the second electronic device and establishing connection between the first electronic device and the target electronic device includes: receiving a selecting operation for the target electronic device from the second electronic device and sending a first request to the target electronic device; and in a case that determination information sent by the target electronic device based on the first request is received, establishing connection with the target electronic device.

That is, after the selecting operation for the target electronic device from the second electronic device is received, the first request may be sent to the target electronic device. After the first request is sent to the target electronic device and the target electronic device receives the first request, a prompt window may be displayed, wherein the prompt window includes a receiving control and a rejection control. In a case that a user clicks the receiving control, after the target electronic device receives the click operation for the receiving control, determination information is sent to the first electronic device, that is, application sharing of the first electronic device is received. In a case that a user clicks the rejection control, after the target electronic device receives the click operation for the rejection control, rejection information is sent to the first electronic device, that is, application sharing of the first electronic device is rejected. In a case that the first electronic device receives the determination information sent by the target electronic device based on the first request, connection with the target electronic device is established. In this way, the first application may be shared to the target electronic device.

In one example, before the step of displaying device information of at least one second electronic device, the method further includes: performing device scanning to acquire device information of the at least one second electronic device. For example, a bluetooth function of the first electronic device is started, device scanning can be connected, and the second electronic device connected through bluetooth can be scanned. it may be understood that at this time, the bluetooth function of the second electronic device is also started, and a distance between the second electronic device and the first electronic device is within a distance range which can be received by a bluetooth signal. In this way, the first electronic device can scan the second electronic device which can be connected through bluetooth through bluetooth scanning.

In one of the embodiments, the step: in a case that the first application runs in the foreground, receiving a first operation includes: in a case that the first application runs in the foreground, receiving a second operation for the first electronic device; in response to the second operation, displaying a control window, wherein the control window includes an application sharing control; and receiving a third operation for the application sharing control.

Operation is performed on the display screen to call out the control window, and the application sharing control in the control window is operated, which may be understood that the first operation includes the second operation and the third operation. In one example, the third operation may be a click operation for the application sharing control. In one example, the second operation may be, but is not limited to a sliding operation for the display screen along a first preset direction, a pull-down operation for a status bar or a click operation for a suspending control in the display screen.

In one of the embodiments, after the step of displaying the control window, the method further includes: in a case that the first application supports sharing, updating the name of the application sharing control based on the name of the first application, wherein the updated name of the application sharing control is displayed in the control window.

That is, in response to the second operation, the control window can be displayed, and then whether the first application supports sharing can be detected. In a case that sharing is supported, the name of the application sharing control is updated by the name of the first application, and the updated name is displayed in the control window, so that a user can understand the name of the shared first application conveniently. For example, the name of the application sharing control is "application sharing", and the name of the first application is X. In a case that the first application supports sharing, the name of the application sharing control is updated based on the name of the first application. For example, the updated name of the application sharing control may be "sharing application X". In one example, after a responding operation is received, in a case that the first application supports sharing, the name of the application sharing control is updated based on the name of the first application, that is, name updating and control window displaying can be performed synchronously, and after the control window is displayed, the updated name is displayed.

The application sharing process is described specifically below with reference to one specific embodiment. The case where the first electronic device is a device A, the first application is an application X and the target electronic device is a device C is taken as an example for description.

Figure 3:
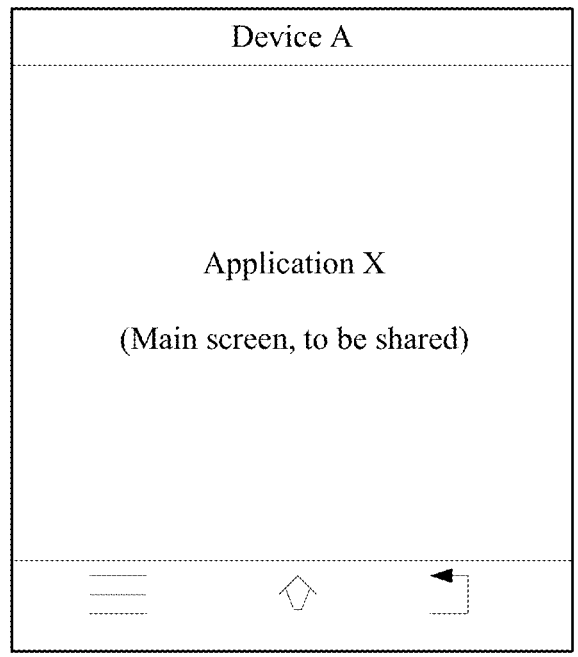
FIG. 3 is a first interface diagram of a first electronic device according to an embodiment of the present application.
Figure 4:
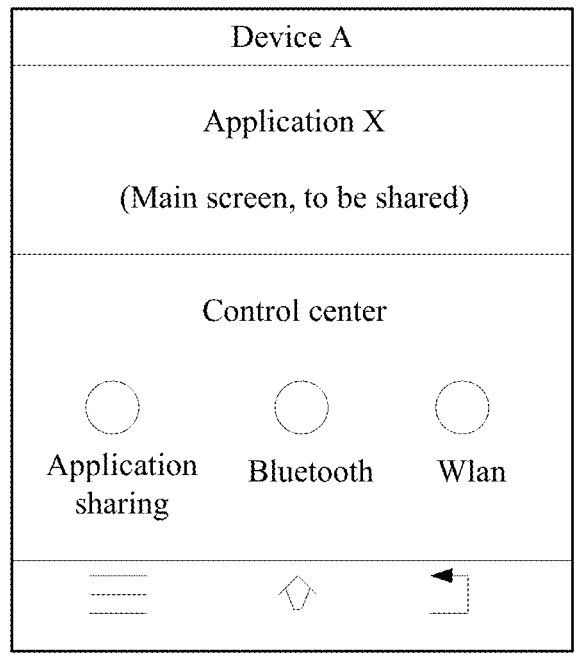
FIG. 4 is a second interface diagram of a first electronic device according to an embodiment of the present application.

As shown in FIG. 3, the device A starts the application X, that is, the device A is using the application X in the foreground of the system, and it is necessary to share the application X to the device C. An application sharing shortcut mode is opened on the device A. Specifically, a shortcut entry for application sharing is at a control center of the device A, and the second operation may be performed on the first electronic device, for example, pulling down a status bar or sliding on the display screen or performing a click operation for a suspending control on the display screen. The control window (which may be understood as a control center) may be displayed in response to the second operation. As shown in FIG. 4, the control window includes an application sharing control, and the name is "application sharing", that is, a shortcut entry for performing application sharing. In addition, after the second operation is received, it can be detected whether the application X which is running supports sharing. In a case that sharing is supported, the name of the application sharing control can be updated according to the name of the application X, for example, the name can be updated as "sharing application X".

A click operation is performed on the application sharing control in the control window on the device A. In response to the click operation, device scanning is started, three connectable devices are scanned through bluetooth, a wireless fidelity point-to-point (WIFI P2P), a network server or historical record, and the names of the three devices are B, C and D respectively.

Figure 5:
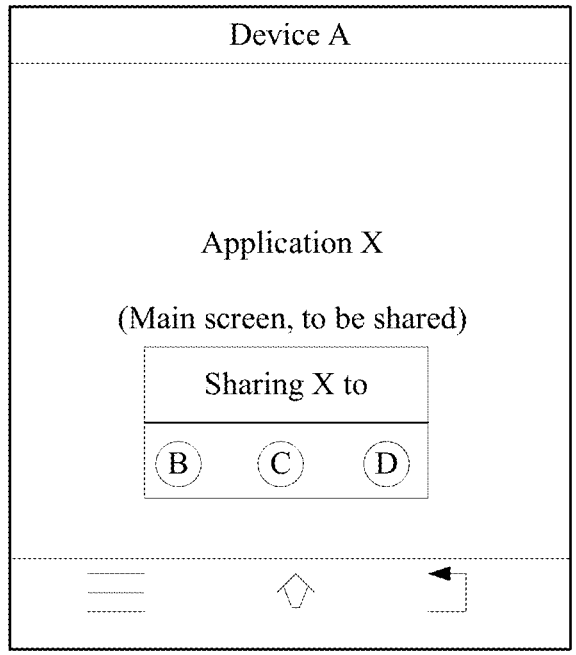
FIG. 5 is a third interface diagram of a first electronic device according to an embodiment of the present application.
Figure 6:
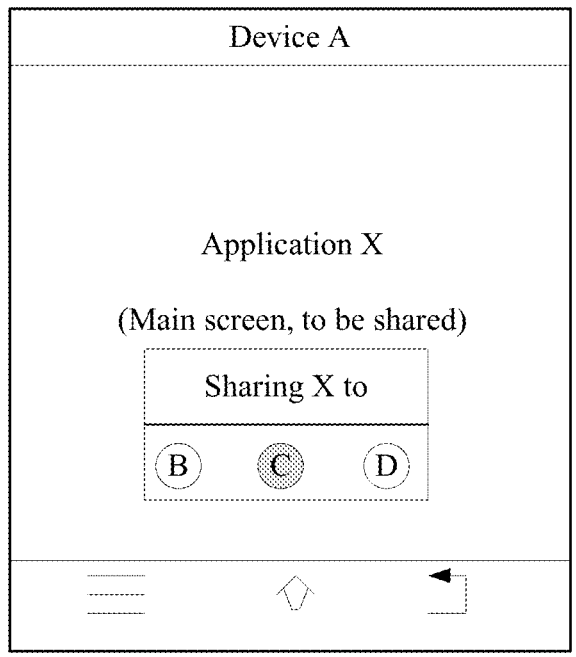
FIG. 6 is a fourth interface diagram of a first electronic device according to an embodiment of the present application.

As shown in FIG. 5, the device names of the three devices can be displayed, and a user can select the device name of application sharing from the displayed device names, for example, a user clicks the device name C, then the device C is selected as a device for receiving application sharing, as shown in FIG. 6. In a case that the device C is at a near end, connection may be performed through bluetooth, WIFI P2P or the network server. In a case that the device C is at a far end, connection may be performed through the network server.

Figure 7:
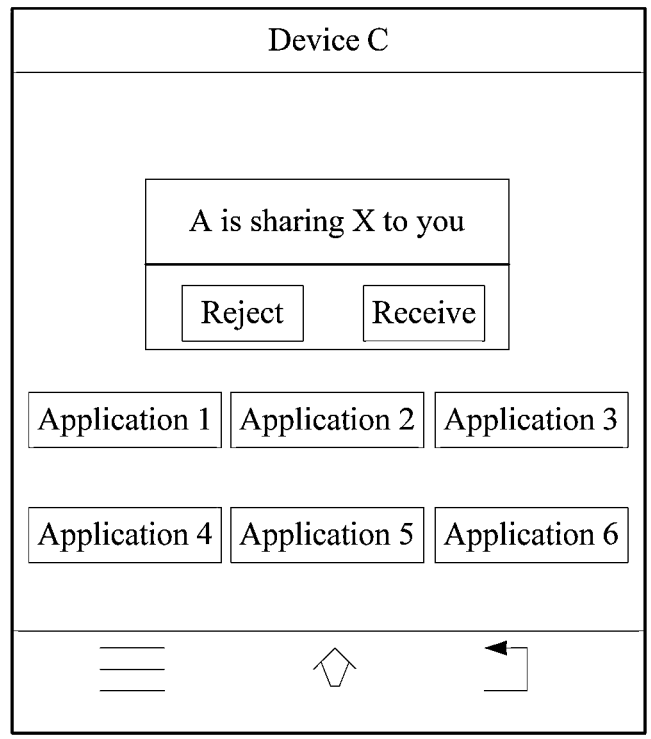
FIG. 7 is a first interface diagram of a target electronic device according to an embodiment of the present application.
Figure 8:
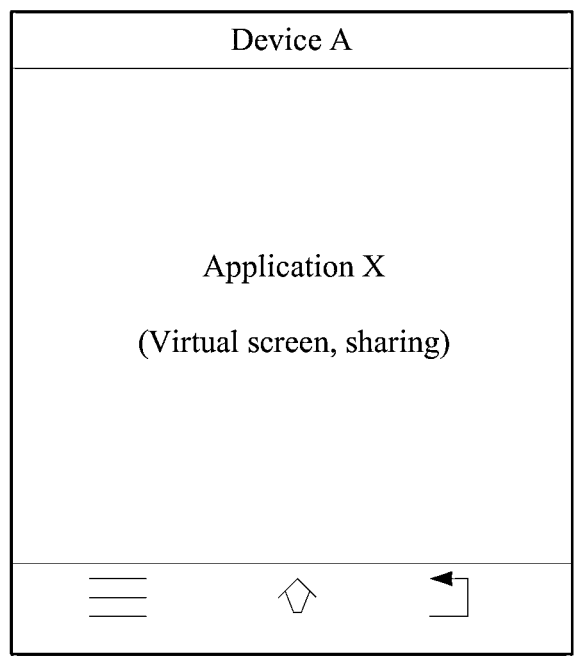
FIG. 8 is a fifth interface diagram of a first electronic device according to an embodiment of the present application.

After the device A sends a first request to the device C and the device C receives the first request, a prompt window will be displayed in the device C, as shown in FIG. 7. The prompt window includes a receiving control and a rejection control. A receiving party clicks the receiving control on the device C to determine that connection is established, that is, determination information is sent to the device A. After the device A receives the determination information, connection with the device C is established. Furthermore, the device A is ready for application sharing. Specifically, the device A may create a virtual screen in the background. At this time, the virtual screen is not displayed on a main screen (that is, not displaying on the display screen may be understood as not running in the foreground and running in the background), and then the running interface of the application X is displayed in the virtual screen. In this process, the display status of the application X is not affected, that is, the running interface of the application X may also be displayed on the display screen. Then the virtual screen may be switched to the foreground to run, as shown in FIG. 8. That is, the display of the display screen is switched from the interface of the application X to the virtual screen, which may be understood that an area of the virtual screen displayed in the foreground coincide with an area of the application X displayed in the foreground.

Figure 9:
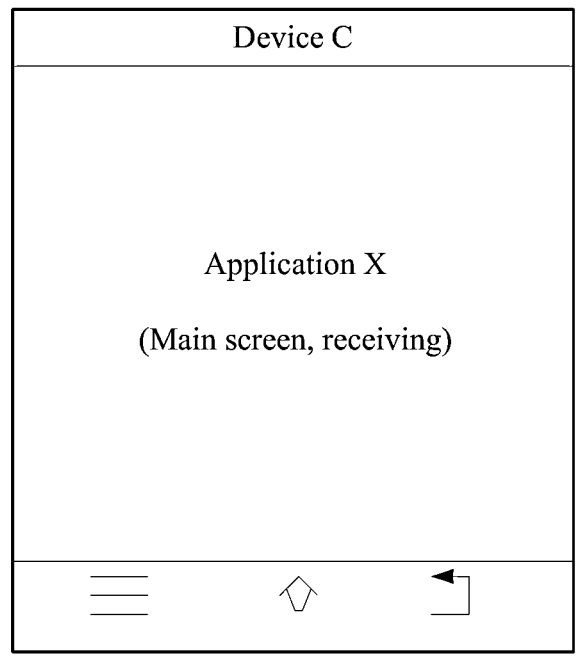
FIG. 9 is a second interface diagram of a target electronic device according to an embodiment of the present application.

The device A may share the running interface of the first application displayed in the virtual screen to the device C, and the device C receives the display content, as shown in FIG. 9. The running interface of the received first application displayed in the virtual screen is played on the screen (that is, the main screen) to share the application X.

By the application sharing method provided by the above embodiment, the first electronic device may share the first application which is running and being used on the first electronic device to the target electronic device immediately, both the devices can view and use the first application at the same time, the progress of the two devices is synchronized, and what you see is what you get. Furthermore, the use of other applications on the device is not affected in the sharing process, the functions of other applications may be realized in a case that sharing is not interrupted, and the shared first application may return to the foreground to run at any time, that is, so that the experience of an application receiving party can be ensured, it will not affect the application sharing party to complete other works on the first electronic device, the behavior logic is natural and efficient, and the utilization rate of the device can be increased.

Figure 10:
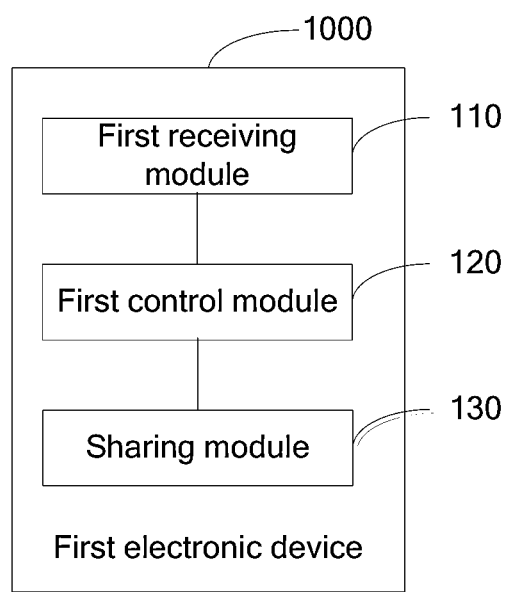
FIG. 10 is a first schematic diagram of an electronic device according to an embodiment of the present application.

As shown in FIG. 10, the present application further provides a first electronic device 1000 of an embodiment. The first electronic device 1000 includes:
  a first receiving module 110, configured to: in a case that a first application runs in the foreground, receive a first operation;
  a first electronic device 120, configured to: in response to the first operation, in a case that a first electronic device is connected to a target electronic device, display a running interface of the first application in a virtual screen; and
  a sharing module 130, configured to: share the running interface of the first application displayed in the virtual screen to the target electronic device.

In one embodiment, the first control module is configured to create the virtual screen and display a running interface of the first application in the virtual screen.

In one embodiment, the electronic device further includes:
  a first display module, configured to display device information of at least one second electronic device; and
  a connection module, configured to receive a selecting operation for the target electronic device from the second electronic device, and establish connection between the first electronic device and the target electronic device.

In one embodiment, the first receiving module includes:
  a second receiving module, configured to: in a case that the first application runs in the foreground, receive a second operation for the first electronic device;
  a second display module, configured to: in response to the second operation, display a control window, wherein the control window includes an application sharing control; and
  A third receiving module, configured to receive a third operation for the application sharing control.

In one embodiment, the electronic device further includes:
  an updating module, configured to: after the second display module performs the display control window, in a case that the first application supports sharing, update the name of the application sharing control based on the name of the first application, wherein the updated name of the application sharing control is displayed in the control window.

The technical feature of the electronic device provided by the embodiments of the present application corresponds to the technical feature of the application sharing method. Each process of the application sharing method is implemented by the electronic device, and a same effect can be achieved. To avoid repetition, details are described herein again.

Figure 11:
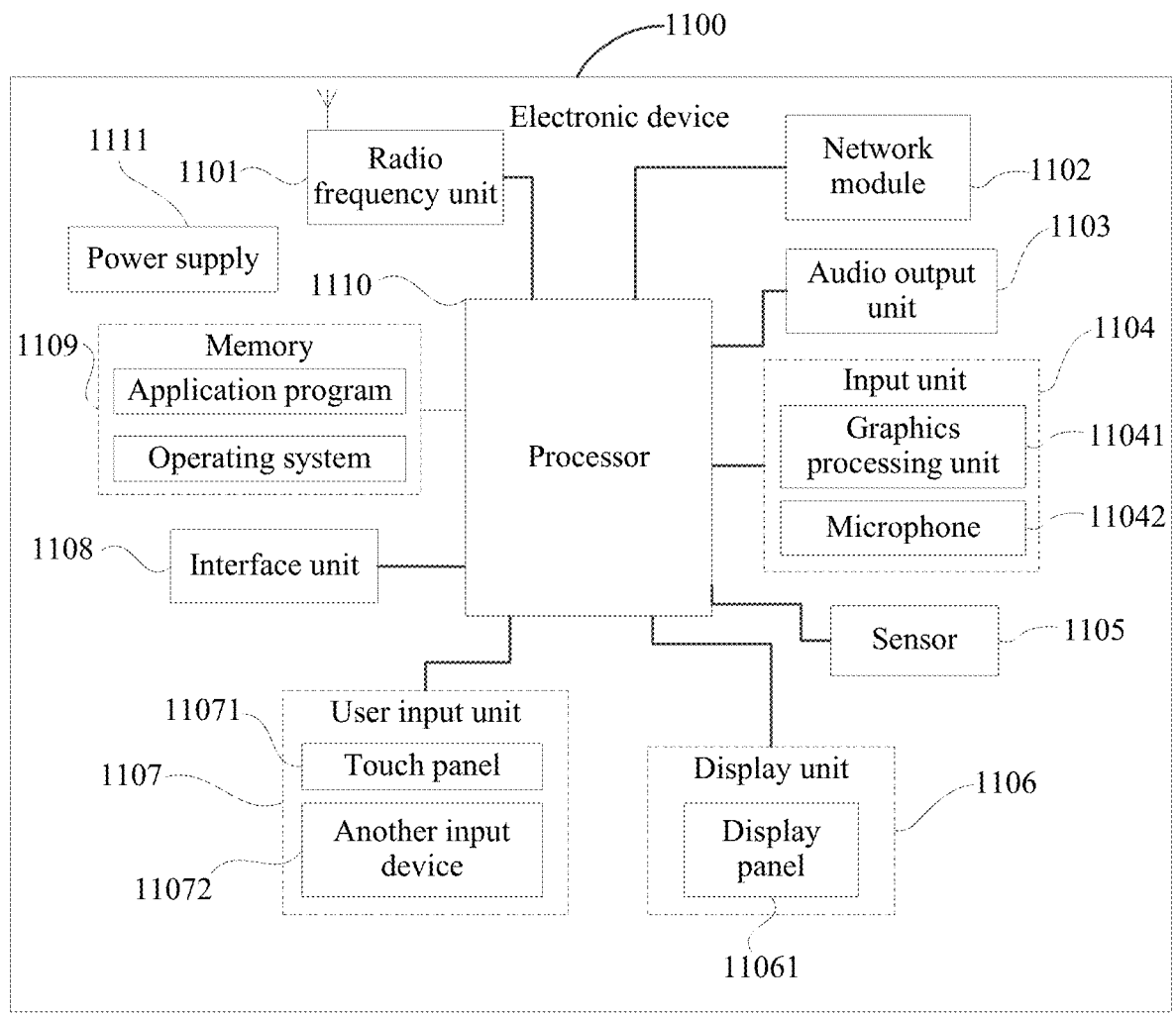
FIG. 11 is a schematic diagram of a hardware structure of an electronic device according to an embodiment of the present application.

FIG. 11 is a schematic diagram of a hardware structure of an electronic device according to each embodiment of the present application. The electronic device 1100 includes, but is not limited to: a radio frequency unit 1101, a network module 1102, an audio output unit 1103, an input unit 1104, a sensor 1105, a display unit 1106, a user input unit 1107, an interface unit 1108, a memory 1109, a processor 1110, a power supply 1111 and the other components. A person skilled in the art may understand that the structure of the electronic device shown in FIG. 11 constitutes no limitation on the electronic device. The electronic device may include more or fewer components than those shown in the figure, or a combination of some components, or an arrangement of different components. In the embodiments of the present application, the electronic device includes, but is not limited to a mobile phone, a tablet personal computer, a notebook computer, a palmtop computer, a vehicle-mounted terminal, a wearable device, a pedometer, or the like.

A user input unit 1107 is configured to: in a case that the first application runs in the foreground, receive a first operation. A processor 1110 is configured to: in response to the first operation, in a case that the first electronic device is connected to the target electronic device, display the running interface of the first application in the virtual screen; and share the running interface of the first application displayed in the virtual screen to the target electronic device.

The first application runs in the foreground, and after the first operation is received, the running interface of the first application is displayed in the virtual screen. At this time, a user still can perform other operations on the first electronic device, for example, related operation for other applications and other functional operations. An operation performed by the user on the first electronic device is not affected by first application sharing. It can be understood that in the process that the first electronic device shares the first application, since the running interface of the first application runs in the virtual screen, other functions of the first electronic device are not affected, and a user still can perform operation for the first electronic device, so that the utilization rate of the first electronic device can be increased.

It should be understood that, in the embodiments of the present application, the radio frequency unit 1101 may be configured to receive and transmit information, or receive and transmit signals during a call. Specifically, the radio frequency unit 1101 receives downlink data from a base station, and transmits the downlink data to the processor 1110 for processing; and in addition, transmits uplink data to the base station. Generally, the radio frequency unit 1101 includes, but is not limited to, an antenna, at least one amplifier, a transceiver, a coupler, a low noise amplifier, a duplexer, and the like. In addition, the radio frequency unit 1101 may also communicate with a network and other devices through a wireless communication system.

The electronic device provides users with wireless broadband Internet access through the network module 1102, for example, helps users receive and send e-mails, browse web pages, and access streaming media.

The audio output unit 1103 may convert audio data received by the radio frequency unit 1101 or the network module 1102 or stored in the memory 1109 into an audio signal and output the audio signal as a sound. Moreover, the audio output unit 1103 can further provide audio output related to a specific function performed the electronic device 1100 (for example, call signal receiving sound and message receiving sound). The audio output unit 1103 includes a speaker, a buzzer, a telephone receiver, and the like.

The input unit 1104 is configured to receive audio or radio frequency signals. The input unit 1104 may include a graphics processing unit (GPU) 11041 and a microphone 11042. The graphics processing unit 11041 processes image data of a static image or a video obtained by an image capturing electronic device (for example, a camera) in a video capturing mode or an image capturing mode. A processed image frame may be displayed on the display unit 1106. The image frame processed by the graphics processing unit 11041 may be stored in the memory 1109 (or another storage medium) or sent by using the radio frequency unit 1101 or the network module 1102. The microphone 11042 may receive sound and can process such sound into audio data. The audio data obtained through processing may be converted, in a telephone call mode, into a format that may be sent to a mobile communication base station via the radio frequency unit 1101 for output.

The electronic device 1100 further includes at least one sensor 1105, for example, a light sensor, a motion sensor, and another sensor. Specifically, the light sensor includes an ambient light sensor and a proximity sensor. The ambient light sensor may adjust brightness of a display panel 11061 according to ambient light brightness. The proximity sensor may switch off the display panel 11061 and/or backlight when the electronic device 1100 moves close to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 1105 may further include a fingerprint sensor, a pressure sensor, an iris sensor, a molecular sensor, a gyroscope, a barometer, a hygrometer, a thermometer, an infrared sensor, or the like. Details are not described herein again.

The display unit 1106 is configured to display information entered by the user or information provided for the user. The display unit 1106 may include a display panel 11061. The display panel 11061 may be configured in a form of a liquid crystal display (LCD), an organic light-emitting diode (OLED), or the like.

The user input unit 1107 may be configured to receive entered number or character information, and generate key signal input related to user settings and function control of the electronic device. Specifically, the user input unit 1107 includes a touch panel 11071 and another input device 11072. The touch panel 11071, also called a touch screen, may collect touch operation for or near the touch panel by users (for example, operation for the touch panel 11071 or near the touch panel 11071 by fingers or any suitable objects or accessories such as a touch pen by the users). The touch panel 11071 may include two parts: a touch detection electronic device and a touch controller. The touch detection electronic device detects a touch orientation of the user, detects a signal brought by the touch operation, and sends the signal to the touch controller. The touch controller receives touch information from the touch detection electronic device, converts the touch information into touch point coordinates, sends the touch point coordinates to the processor 1110, and receives and executes a command sent by the processor 1110. In addition, the touch panel 11071 may be implemented by various types such as a resistive type, a capacitive type, an infrared ray type or a surface acoustic wave type. In addition to the touch panel 11071, the user input unit 1107 may further include other input devices 11072. Specifically, the other input devices 11072 may include but are not limited to: a physical keyboard, a function button (such as a volume control button, a switch button), a trackball, a mouse, and a joystick, which is not described herein.

Further, the touch panel 11071 may cover the display panel 11061. After detecting the touch operation for or near the touch panel 11071, the touch panel 11071 transmits the touch operation to the processor 1110 to determine a type of a touch event, and then the processor 1110 provides corresponding visual output on the display panel 11061 based on the type of the touch event. Although in FIG. 11, the touch panel 11071 and the display panel 11061 are configured as two independent components to implement input and output functions of the electronic device, in some embodiments, the touch panel 11071 and the display panel 11061 can be integrated to implement the input and output functions of the electronic device. Details are not limited herein.

The interface unit 1108 is an interface for connecting an external electronic device with the electronic device 1100. For example, the external electronic device may include a wired or wireless headphone port, an external power supply (or a battery charger) port, a wired or wireless data port, a storage card port, a port used to connect to an electronic device having an identity module, an audio input/output (I/O) port, a video I/O port, a headset port, and the like. The interface unit 1108 may be configured to receive input (for example, data information and power) from an external electronic device and transmit the received input to one or more elements in the electronic device 1100 or may be configured to transmit data between the electronic device 1100 and an external electronic device.

The memory 1109 may be configured to store a software program and various pieces of data. The memory 1109 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 1109 may include a high-speed random access memory or a nonvolatile memory, for example, at least one disk storage device, a flash memory, or other non-volatile solid-state storage devices.

The processor 1110 is a control center of the electronic device and connects all parts of the electronic device using various interfaces and circuits. By running or executing software programs and/or modules stored in the memory 1109 and by calling data stored in the memory 1109, the processor 1110 implements various functions of the electronic device and processes data, thus performing overall monitoring on the electronic device. The processor 1110 may include one or more processing units. Preferably, an application processor and a modem processor may be integrated into the processor 1110. The application processor mainly processes an operating system, a user interface, an application program, and the like. The modem processor mainly processes wireless communications. It can be understood that the foregoing modem processor may not be integrated into the processor 1110.

The electronic device 1100 may further include the power supply 1111 (for example, a battery) supplying power to various components. Preferably, the power supply 1111 may be logically connected to the processor 1110 through a power management system, so as to implement functions such as managing charging, discharging, and power consumption through the power management system.

In addition, the electronic device 1100 includes some functional modules not shown. Details are not described herein again.

The embodiments of the present invention further provide an electronic device, including a processor 1110 and a memory 1109, wherein the memory 1109 stores a computer program capable of running on the processor 1110; when the computer program is executed by the processor 1110, each process of the application sharing method embodiments is implemented; and a same technical effect can be achieved. To avoid repetition, details are described herein again.

The embodiments of the present application further provide a computer-readable storage medium. The computer-readable storage medium stores a computer program; when the computer program is executed by a processor, the foregoing processes of the foregoing application sharing method embodiments are implemented; and a same technical effect can be achieved. To avoid repetition, details are not described herein again. The computer-readable storage medium is a read-only memory (ROM), a random access memory (RAM), a magnetic disk, an optical disc, or the like.

It should be noted that terms "including", "comprising" or any other variants thereof are intended to cover non-exclusive inclusion, so that a process, method, article or device including a series of elements includes not only those elements but also other elements not explicitly listed, or elements inherent to such a process, method, article, or device. Without more restrictions, an element defined by the phrase "including a . . . " does not exclude the presence of another same element in a process, method, article, or electronic device that includes the element.

Based on the descriptions of the foregoing implementations, a person skilled in the art may clearly understand that the method in the foregoing embodiments may be implemented by software in addition to a necessary universal hardware platform or by hardware only. In most circumstances, the former is a preferred implementation. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing an electronic device (which may be a mobile phone, a computer, a server, an air conditioner, a network device, or the like) to perform the method disclosed in the embodiments of this application.

The technical features of the above embodiments may be arbitrarily combined. For brevity of description, all possible combinations of the technical features in the above embodiments are not described. However, as long as there is no contradiction between the combinations of these technical features, all these combinations should be considered as the scope of this specification.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims and the protection scope of claims of this application, all of which fall within the protection scope of this application.

The invention claimed is:

1. An application sharing method, applied to a first electronic device, wherein the method comprises:
   in a case that a first application runs in the foreground, receiving a first operation;
   in response to the first operation, in a case that a first electronic device is connected to a target electronic device, displaying a running interface of the first application in a virtual screen; and
   sharing the running interface of the first application displayed in the virtual screen with the target electronic device;
   wherein the displaying the running interface of the first application in the virtual screen comprises:
   creating the virtual screen in the background and displaying the running interface of the first application in the virtual screen in the background;
   wherein the receiving a first operation in a case that the first application runs in the foreground comprises:
   in a case that the first application runs in the foreground, receiving a second operation for the first electronic device;
   in response to the second operation, displaying a control window, wherein the control window comprises an application sharing control; and
   receiving a third operation for the application sharing control;
   wherein after the displaying the control window, the method further comprises:
   in a case that the first application supports sharing, updating the name of the application sharing control based on the name of the first application,
   wherein the updated name of the application sharing control is displayed in the control window.

2. The method according to claim 1, wherein before the displaying the running interface of the first application in the virtual screen in a case that the first electronic device is connected to the target electronic device, the method further comprises:
   displaying device information of at least one second electronic device; and
   receiving a selecting operation for the target electronic device from the second electronic device, and establishing connection between the first electronic device and the target electronic device.

3. A first electronic device, comprising: a memory and a processor, wherein the memory stores a computer program; and the computer program, when being executed by the processor, implements:
   in a case that a first application runs in the foreground, receiving a first operation;
   in response to the first operation, in a case that a first electronic device is connected to a target electronic device, displaying a running interface of the first application in a virtual screen; and
   sharing the running interface of the first application displayed in the virtual screen with the target electronic device;
   wherein the displaying the running interface of the first application in the virtual screen comprises:
   creating the virtual screen in the background and displaying the running interface of the first application in the virtual screen in the background;
   wherein the receiving a first operation in a case that the first application runs in the foreground comprises:
   in a case that the first application runs in the foreground, receiving a second operation for the first electronic device;
   in response to the second operation, displaying a control window, wherein the control window comprises an application sharing control; and
   receiving a third operation for the application sharing control;
   wherein the computer program, when being executed by the processor, further implements:
   after the displaying the control window,
   in a case that the first application supports sharing, updating the name of the application sharing control based on the name of the first application,
   wherein the updated name of the application sharing control is displayed in the control window.

4. The first electronic device according to claim 3, wherein the computer program, when being executed by the processor, further implements the following step before the displaying the running interface of the first application in the virtual screen in a case that the first electronic device is connected to the target electronic device:
   displaying device information of at least one second electronic device; and
   receiving a selecting operation for the target electronic device from the second electronic device, and establishing connection between the first electronic device and the target electronic device.

5. A non-transitory computer readable storage medium, wherein the non-transitory computer readable storage medium stores a computer program; and the computer program, when being executed by a processor of a first electronic device, implements:
   in a case that a first application runs in the foreground, receiving a first operation;
   in response to the first operation, in a case that a first electronic device is connected to a target electronic device, displaying a running interface of the first application in a virtual screen; and
   sharing the running interface of the first application displayed in the virtual screen with the target electronic device;
   wherein the displaying the running interface of the first application in the virtual screen comprises:
   creating the virtual screen in the background and displaying the running interface of the first application in the virtual screen in the background;
   wherein the receiving a first operation in a case that the first application runs in the foreground comprises:
   in a case that the first application runs in the foreground, receiving a second operation for the first electronic device;
   in response to the second operation, displaying a control window, wherein the control window comprises an application sharing control; and
   receiving a third operation for the application sharing control;
   wherein the computer program, when being executed by the processor, further implements:
   after the displaying the control window, in a case that the first application supports sharing, updating the name of the application sharing control based on the name of the first application, wherein the updated name of the application sharing control is displayed in the control window.

6. The non-transitory computer readable storage medium according to claim 5, wherein the computer program, when being executed by the processor, further implements the following step:

before the displaying the running interface of the first application in the virtual screen in a case that the first electronic device is connected to the target electronic device, displaying device information of at least one second electronic device; and receiving a selecting operation for the target electronic device from the second electronic device, and establishing connection between the first electronic device and the target electronic device.

* * * * *